(12) United States Patent
Chen et al.

(10) Patent No.: US 9,067,397 B2
(45) Date of Patent: Jun. 30, 2015

(54) HYBRID PIPE DESIGN AND METHOD OF MANUFACTURE

(71) Applicant: Changchun Gaoxiang Special Pipe Co., Ltd., Changchun Jilinchun (CH)

(72) Inventors: Bin Chen, Houston, TX (US); Yanhua Xiu, ChangChun (CH); Shichun Li, ChangChun (CH); Pingyuan Xia, ChangChun (CH)

(73) Assignee: Changchun Gaoxiang Special Pipe Co., LTD., Changchun (CN)

( * ) Notice: Subject to any disclaimer, the term of this patent is extended or adjusted under 35 U.S.C. 154(b) by 122 days.

(21) Appl. No.: 13/794,239

(22) Filed: Mar. 11, 2013

(65) Prior Publication Data

US 2014/0251485 A1 Sep. 11, 2014

(51) Int. Cl.
| | |
|---|---|
| *F16L 11/00* | (2006.01) |
| *B32B 37/16* | (2006.01) |
| *F16L 11/08* | (2006.01) |
| *B32B 1/08* | (2006.01) |
| *B32B 27/00* | (2006.01) |
| *B29D 23/00* | (2006.01) |
| *B29C 53/58* | (2006.01) |

(52) U.S. Cl.
CPC ............... *B32B 37/16* (2013.01); *F16L 11/088* (2013.01); *B29C 53/58* (2013.01); *B32B 1/08* (2013.01); *B32B 27/00* (2013.01); *B29D 23/001* (2013.01)

(58) Field of Classification Search
CPC .. B32B 7/16226; B32B 37/16; B32B 37/185; B29C 70/30; B60T 17/04; F16L 11/082; F16L 11/083; F16L 11/085; F16L 11/087; F16L 11/088; F16L 11/24; F16L 11/045; F16L 11/081; B29D 23/004

USPC ......... 138/125, 129, 130, 137, 141, 144, 148, 138/149, 124, 127; 156/123, 187, 188, 60
See application file for complete search history.

(56) References Cited

U.S. PATENT DOCUMENTS

| | | | | |
|---|---|---|---|---|
| 1,566,512 | A | * | 12/1925 | Subers ........................ 138/130 |
| 1,900,041 | A | * | 3/1933 | Brodhun .................. 174/113 R |

(Continued)

OTHER PUBLICATIONS

Flexsteel Pipe Webpage, www.flexsteelpipe.com/print/87, Feb. 12, 2013.

(Continued)

*Primary Examiner* — Frederick C Nicolas
*Assistant Examiner* — Bob Zadeh
(74) *Attorney, Agent, or Firm* — James W. Pravel; Intellalegal (57) ABSTRACT

A hybrid flexible pipe and method of manufacture having one or more web layers over a tubular core and a polymer layer over the web layers and tubular core. A flexible helical reinforcement layer having gaps between strips is wrapped on top of the polymer layer. A second flexible helical reinforcement layer having gaps between strips is helically wrapped around the first helical reinforcement layer in the opposite direction. A sheath layer is positioned as the outermost layer. A first flexible helical anti-extrusion layer having a first anti-extrusion strip can be helically wrapped around the first flexible helical reinforcement layer in substantially the same direction as the first flexible reinforcement layer and a second flexible helical anti-extrusion layer having a second anti-extrusion strip can be helically wrapped around the at least one second flexible helical reinforcement layer in substantially the same direction as the second flexible helical reinforcement layer.

11 Claims, 9 Drawing Sheets

(56) References Cited

U.S. PATENT DOCUMENTS

| | | | | |
|---|---|---|---|---|
| 1,973,756 | A | * | 9/1934 | Gish .............................. 138/125 |
| 4,273,160 | A | * | 6/1981 | Lowles ......................... 138/124 |
| 4,402,346 | A | * | 9/1983 | Cheetham et al. ............ 138/129 |
| 4,427,033 | A | * | 1/1984 | Ege ............................... 138/103 |
| 5,813,439 | A | * | 9/1998 | Herrero et al. ................ 138/134 |
| 6,705,351 | B2 | | 3/2004 | Fraser |
| 8,485,229 | B2 | * | 7/2013 | Jackson et al. ................ 138/137 |

OTHER PUBLICATIONS

GE Oil & Gas Wellstream flexible pipe solutions brochure, 2011.
Airborne Oil & Gas: Pipe Design Webpage, www.airborne.nl, 2010.

* cited by examiner

HYBRID PIPE DESIGN AND METHOD OF MANUFACTURE

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

This invention relates to the field of flexible pipe having multiple, reinforcing layers.

2. Description of the Related Art

Flexible multilayer pipe is known in the art. However, existing multilayer pipes have significant disadvantages. Pipes that have multiple helically wound layers are generally bonded to the core. The bonding reduces flexibility of the pipe and it causes the individual layers to separate from the core as the pipe is repeatedly flexed. To improve flexibility, helical wrapped layers can be used that are not bonded to the core. Attempts have been made to helically wrap multiple unbonded layers of steel strips over a core. For example, see U.S. Pat. No. 6,705,351. In such a configuration, gaps are needed between successive wraps of the steel strips to allow the pipe to flex. Tabs or welds or other means are necessary in such a configuration to be sure that gaps will exist between wraps. Also, the use of steel in such a configuration is both heavy and expensive.

What is needed is a flexible multi-layer pipe that is lightweight, inexpensive and flexible. The resulting pipe should not need tabs or welds between wraps of the strips.

BRIEF SUMMARY OF THE INVENTION

The invention defines a hybrid flexible pipe, which comprises a tubular core having a longitudinal passage for internal fluid. At least one web layer that is comprised of a plurality of webbed wires is positioned on top of the tubular core. A polymer layer is extruded over and fused with or is otherwise adhered to the tubular core and the web layer.

At least one first flexible helical reinforcement layer comprised of a first strip is helically wrapped on top of the polymer layer. The first strip is wrapped to form a first gap between consecutive wraps of the first strip.

At least one second flexible helical reinforcement layer comprised of a second strip is helically wrapped around the first helical reinforcement layer in a direction substantially opposite to that of the first strip. The second strip is wrapped to form a second gap between the consecutive wraps of the second strip. A sheath layer is positioned as the outermost layer.

The inventive hybrid flexible pipe can also include a plurality of web layers positioned on the tubular core. Also, a first flexible helical anti-extrusion layer comprised of a first anti-extrusion strip can be helically wrapped around the at least one first flexible helical reinforcement layer; and the first anti-extrusion strip is wrapped in substantially the same direction as the at least one first strip. The first anti-extrusion strip substantially covers the first gap between the consecutive wraps of the first strip.

A second flexible helical anti-extrusion layer comprised of a second anti-extrusion strip can be helically wrapped around the at least one second flexible helical reinforcement layer in substantially the same direction as the at least one second strip. The second anti-extrusion strip substantially covers the gaps between the consecutive wraps of the second strip.

An inventive method of manufacturing a hybrid flexible pipe is also disclosed comprising the steps of:

a. adding at least one web layer around a tubular core having a longitudinal passage for internal fluid;

b. positioning a polymer layer over said tubular core and the at least one web layer;

c. wrapping at least one first flexible helical reinforcement layer comprising a first strip on top of the polymer layer;

d. forming a first gap between consecutive wraps of the first strip;

e. wrapping at least one second flexible helical reinforcement layer comprising a second strip around the at least one first helical reinforcement layer in a direction substantially opposite to that of the first strip;

f. forming a second gap between consecutive wraps of the second strip; and g. positioning a sheath layer as the outermost layer.

Additional steps in the method of manufacturing the hybrid pipe can also include the steps of:

h. positioning a plurality of web layers on the tubular core;

i. wrapping a first flexible helical anti-extrusion layer comprised of a first anti-extrusion strip around the at least one first flexible helical reinforcement layer in substantially the same direction as the at least one first strip;

j. substantially covering the first gap between the consecutive wraps of the first strip with the first anti-extrusion strip;

k. wrapping a second flexible helical anti-extrusion layer comprised of a second anti-extrusion strip around the at least one second flexible helical reinforcement layer in substantially the same direction as the at least one second strip; and l. substantially covering the second gap between the consecutive wraps of the second strip with the second anti-extrusion strip.

When the polymer layer is extruded over the tubular core and the at least one web layer it can be fused or glued with adhesive to the tubular core and to the one or more web layers. The resulting combination of layers creates a very strong barrier that prevents the extrusion of the core and therefore avoids the need to use tabs or welds between strips of the helical reinforcing layers. Without the combination of a fused or glued polymer layer to the core and to the one or more web layers, the core can extrude through the gaps between the strips between consecutive wraps of the helical reinforcement layers which can compromise the integrity of the pipe. Such a potentially compromised core strength creates a need to be overly concerned with changes in the width in gaps between the strips of consecutive wraps of the helical reinforcement layers. This inventive pipe eliminates the need to include such tabs or welds between the strips between the consecutive wraps of the helical reinforcement layers.

DETAILED DESCRIPTION OF THE INVENTION

The following parts list is provided to assist with the understanding of the invention as illustrated in the attached figures:

| Part Number: | Description: |
|---|---|
| P | Hybrid pipe |
| 10 | Tubular core |
| 20 | First web layer |
| 20a | Second web layer |
| 20b | Web layer with 2 × 2 pattern braid |
| 22 | First wire group (shown wound clockwise) |
| 24 | Second wire group (shown wound counter clockwise) |
| Θ | Wire group lay angle |
| 25 | Wire |
| 26 | Gap in web layer between wire groups |
| 30 | Polymer extruded layer |
| 32 | Thin polymer tape layer |
| 40 | First flexible helical reinforcement layer |
| α | Reinforcement layer lay angle |
| 42 | First strip |
| 44 | First gap |
| 50 | Second flexible helical reinforcement layer |
| 52 | Second strip |
| 54 | Second gap |
| 60 | Polymer tape |
| 70 | Sheath layer |
| 80 | First flexible helical anti-extrusion layer |
| 82 | First anti-extrusion strip |
| 84 | First anti-extrusion gap |
| 90 | Second flexible helical anti-extrusion layer |
| 92 | Second anti-extrusion strip |
| 94 | Second anti-extrusion gap |
| 110 | Insulation layer |
| 120 | Weight layer |
| 130 | Electric Insulation layer |
| 140 | Wide strip layer |
| 142 | Wide strip |
| 144 | Wide strip gap |
| 150 | Die |

Figure 1:
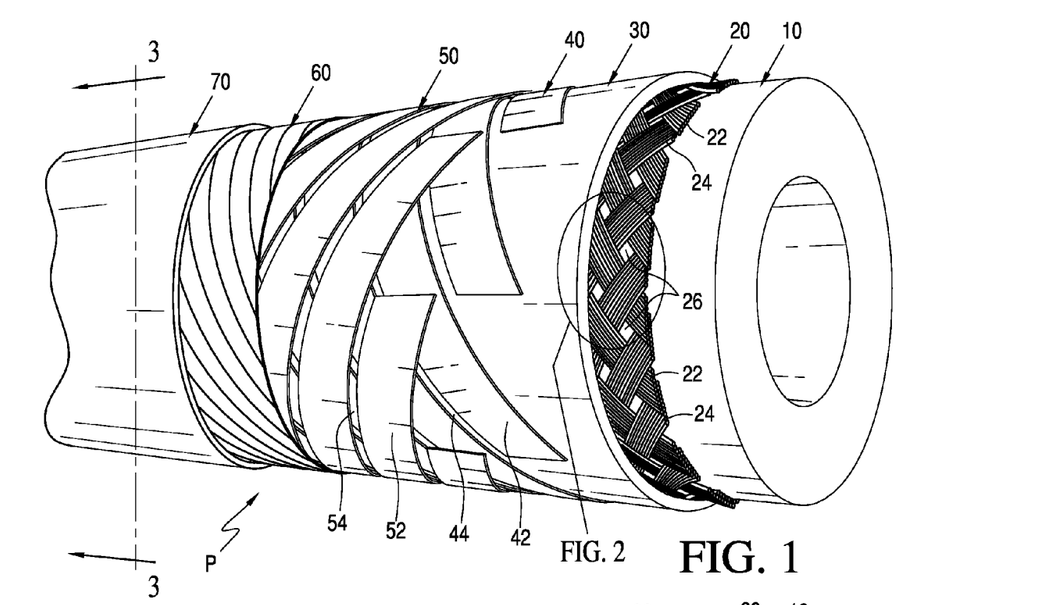
FIG. 1 is a partial isometric view showing the inventive pipe with the core, a single web layer, an extruded polymer layer, a first and a second flexible helical reinforcement layer, a polymer tape layer and a sheath layer.

FIGS. 1, 1A, 1B, 1C and 1D show embodiments of the inventive hybrid pipe P. In FIG. 1 a tubular core 10, is covered by a first web layer 20. The first web layer 20 is comprised of a plurality of webbed wires 25, to be described herein.

The first web layer 20 is typically constructed of 24 groups of wires 25 with 10 wires per wire group. Individual wires 25 that comprise the first web layer 20 can be best seen in FIG. 2. It is to be understood that the first web layer 20 and the second web layer 20b, and any subsequent web layers, include individual wires 25. The wires 25 are typically 0.2 mm to 1 mm in diameter, but they may also be smaller or larger in diameter. More or less than 24 groups can be used and more or less than 10 wires can be used per group.

Figure 6A:
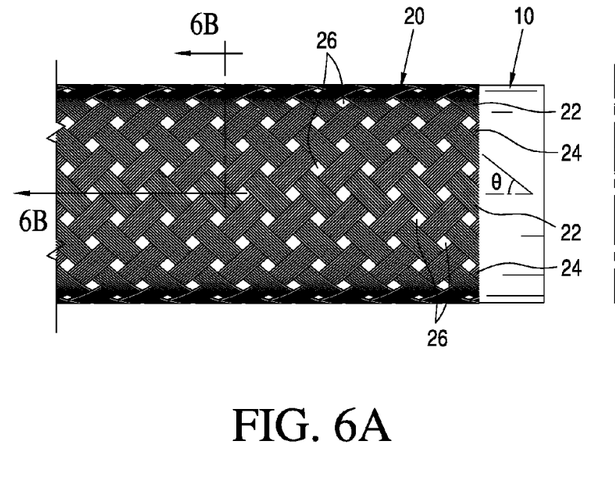
FIG. 6A partial side view showing the inventive pipe with the core and a 1×1 pattern braided wire web.
Figure 6B:
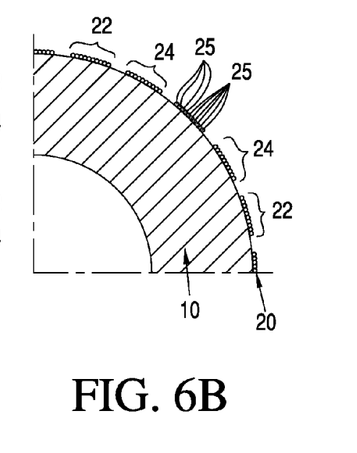
FIG. 6B is a quarter section view taken from line 6B-6B from FIG. 6A.

Each group 22, 24 of wires 25 typically has an lay angle Θ relative to the longitudinal axis of the pipe P of between 0 and 90 degrees. The representative lay angle Θ is illustrated in FIG. 6A.

Figure 7A:
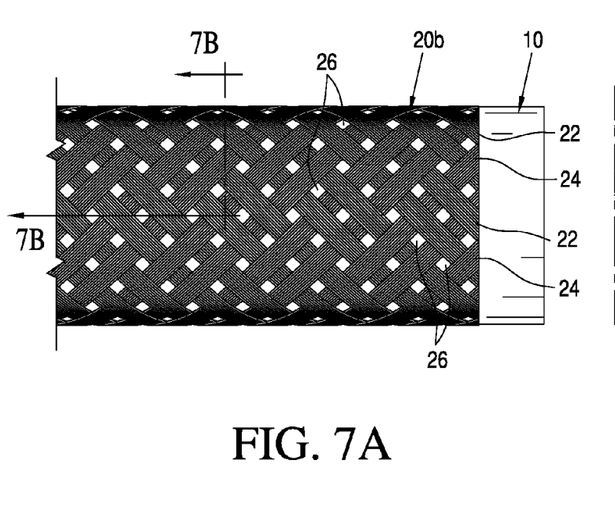
FIG. 7A is a partial side view showing the inventive pipe with the core and a 2×2 pattern braided wire web.
Figure 7B:
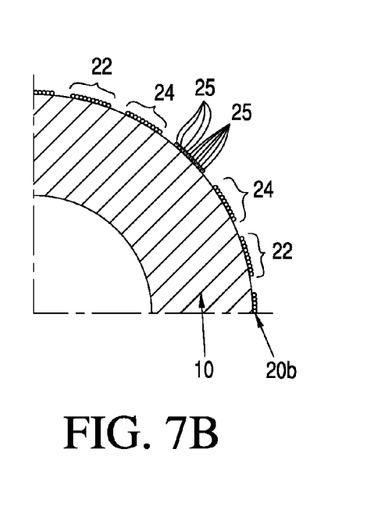
FIG. 7B is a quarter section view taken from line 7B-7B from FIG. 7A.

The web layer 20 can include webbed wires in a variety of configurations. The webbing can include weave patterns as shown in FIGS. 6A and 7A. In FIG. 6A there is a 1×1 weave pattern (identified as web layer 20) with a first single wire group 22 overlapping a single second wire group 24 in a 1×1 pattern. In FIG. 7A there is a 2×2 weave pattern (identified as web layer 20b) with pairs of wire groups 22 braided with pairs of wire groups 24. It is contemplated that other weave patterns, such as 3×3, 4×4, etc. may be used for the web layer 20. Also, the first wire group 22 and second wire group 24 can be helically wrapped around the core without being braided at all. The wire group 22 and wire group 24 in such a configuration would be wrapped opposite to one another to balance the torque. The wires 25 can be constructed of metal or other materials such as fiberglass, or carbon fiber, etc.

Figure 11:
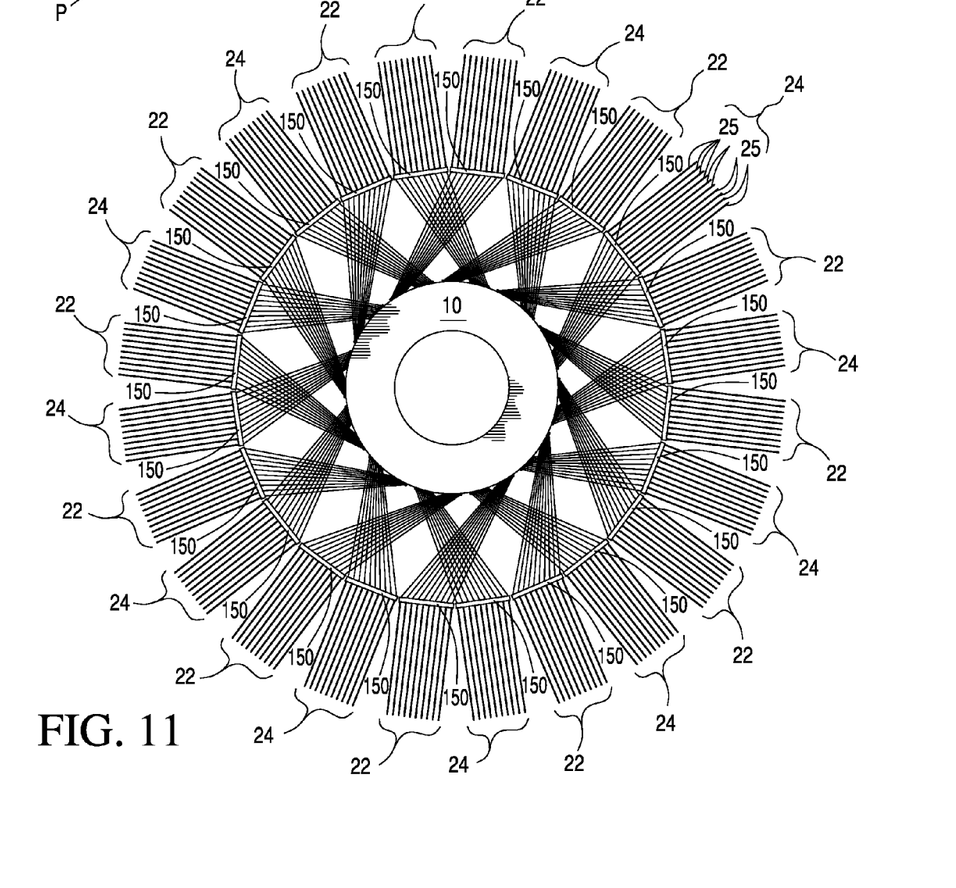
FIG. 11 is a cross section view of a portion of a winding machine showing multiple groups of wires guided by dyes with the wires forming a web layer on a core.

A cross section of a portion of a webbing machine is shown in FIG. 11. Individual wires 25 are positioned with dies 150.

The wires 25 are formed into wire groups 22 and 24. The first wire group 22 is shown being wrapped clockwise onto the tubular core 10. The second wire group 24 is shown being wrapped counter-clockwise onto the tubular core 10.

Figure 2:
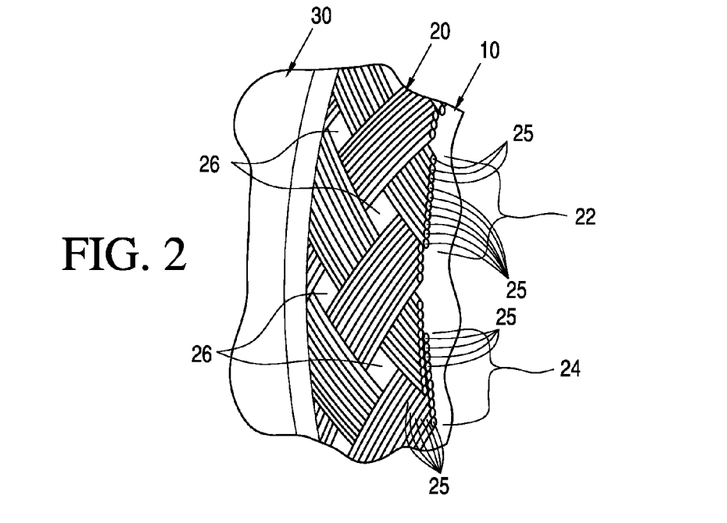
FIG. 2 is an enlarged detail view taken from FIG. 1.
Figure 3:
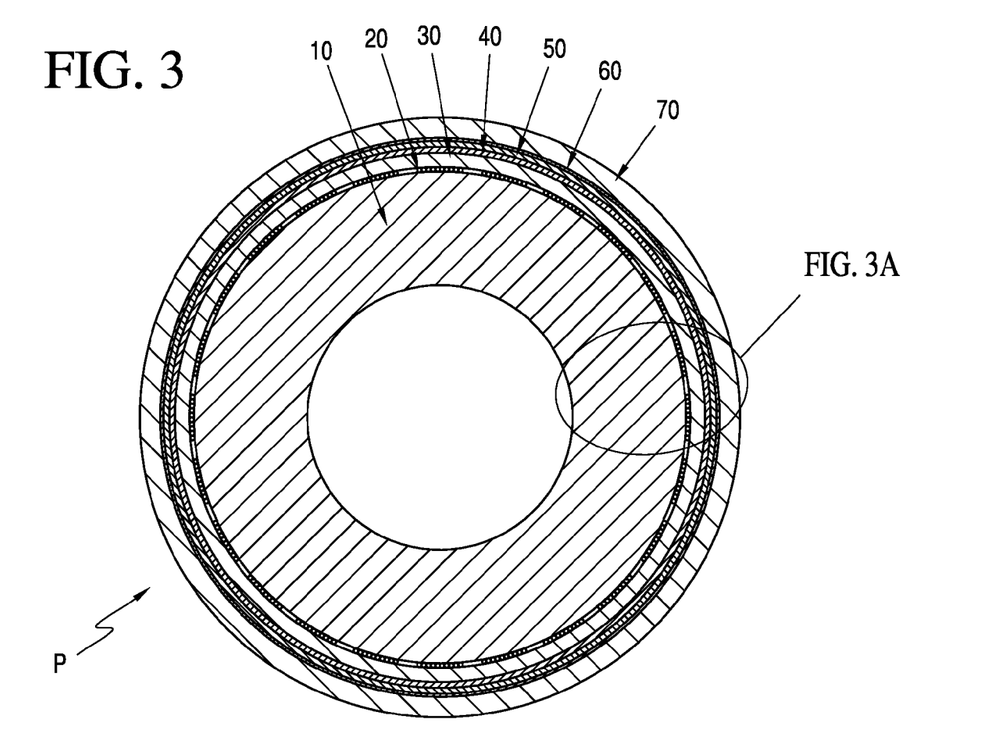
FIG. 3 is a cross sectional view of the inventive pipe taken from line 3-3 of FIG. 1.
Figure 3A:
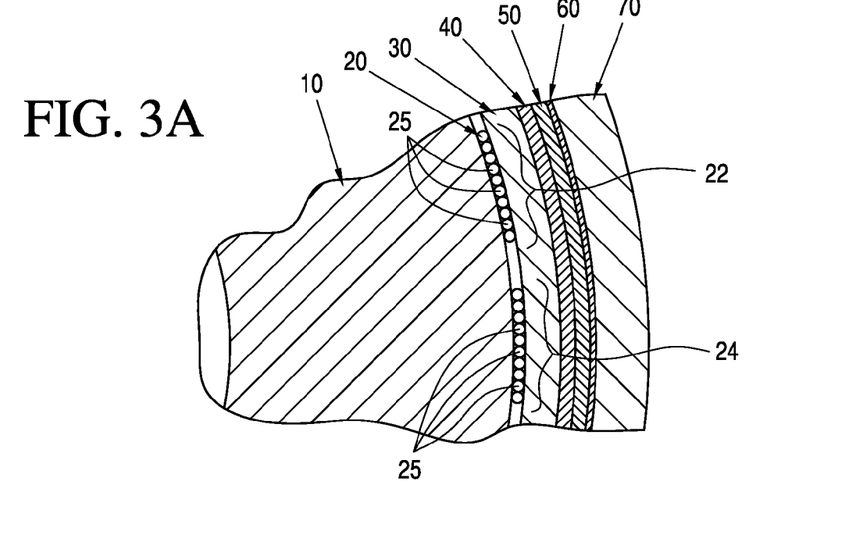
FIG. 3A is an enlarged detail view taken from FIG. 3.
Figures 4, 4A:
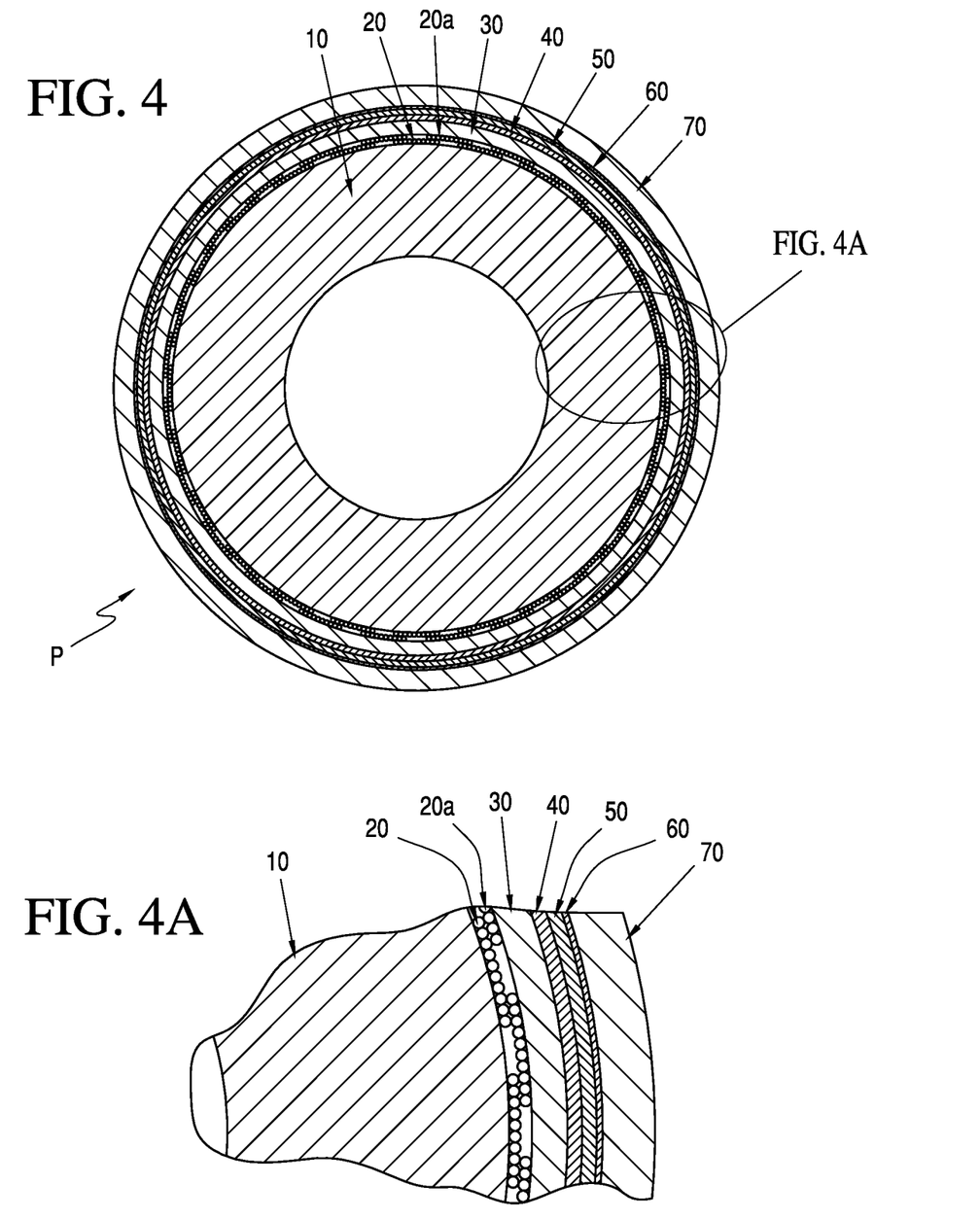
FIG. 4 is a cross sectional view of the inventive pipe showing multiple web layers.
FIG. 4A is an enlarged sectional view taken from FIG. 4.

The web layer 20 or 20a, or any subsequent web layers, will typically cover 40% to 95% of the outer surface of the tubular core 10. The web layer 20 provides both axial and hoop strength to the pipe P. As best seen in FIG. 2, the web coverage area decreases as the size of each gap 26 in the web 20 or 20b, or in any subsequent web layer, increases.

A polymer layer 30 is fused with heat and/or pressure to the tubular core 10 and to the web layer 20. Alternatively, the polymer layer can also be affixed with an adhesive to the tubular core 10 and to the web layer 20. The resulting bonding between the polymer layer 30, the web layer 20 and the tubular core 10 provides high collapse resistance to external hydrostatic pressure. If multiple web layers are used including 20a, or subsequent layers, the polymer layer 30 is typically fused or otherwise adhered to all of the web layers 20, 20a and any subsequent layers and to the tubular core 10.

Figure 1A:
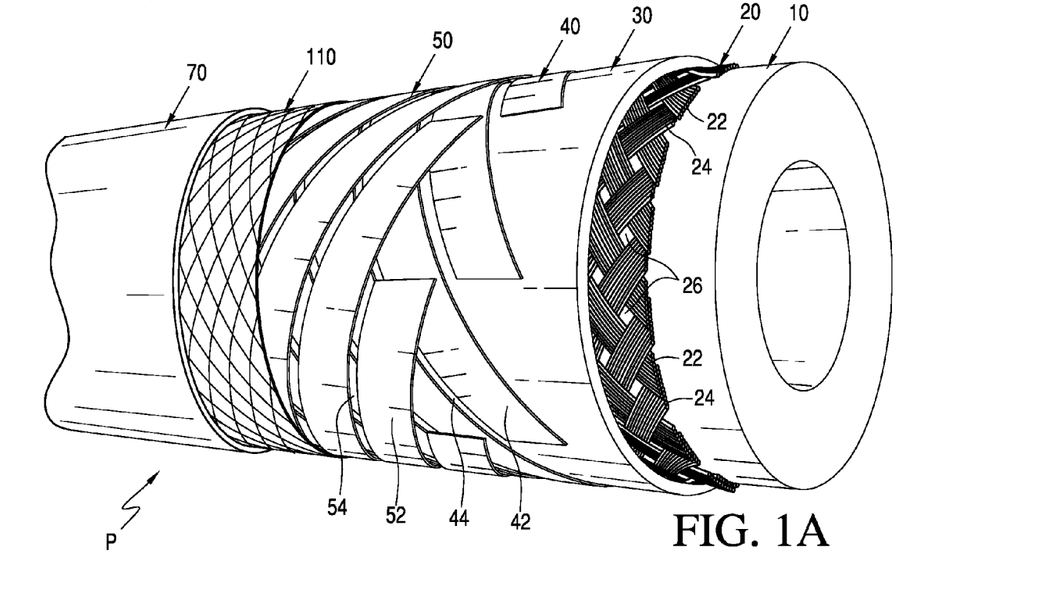
FIG. 1A is a partial isometric view showing the inventive pipe with the core, a single web layer, an extruded polymer layer, a first and a second flexible helical reinforcement layer, an insulation layer and a sheath layer.
Figure 1B:
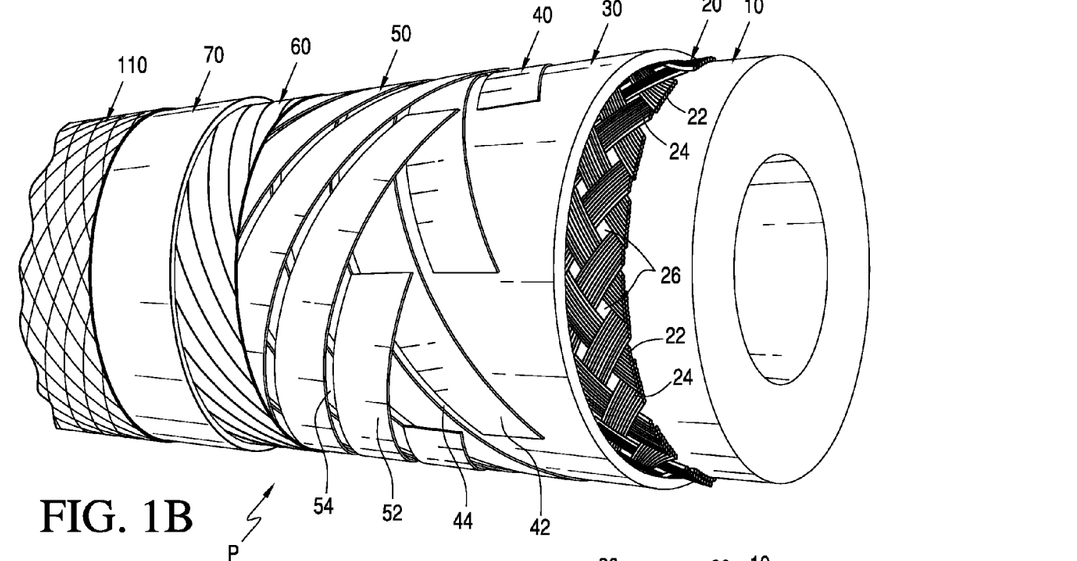
FIG. 1B is a partial isometric view showing the inventive pipe with the core, a single web layer, an extruded polymer layer, a first and a second flexible helical reinforcement layer, a polymer tape layer, a sheath layer and an insulation layer outside of the sheath layer.
Figure 1C:
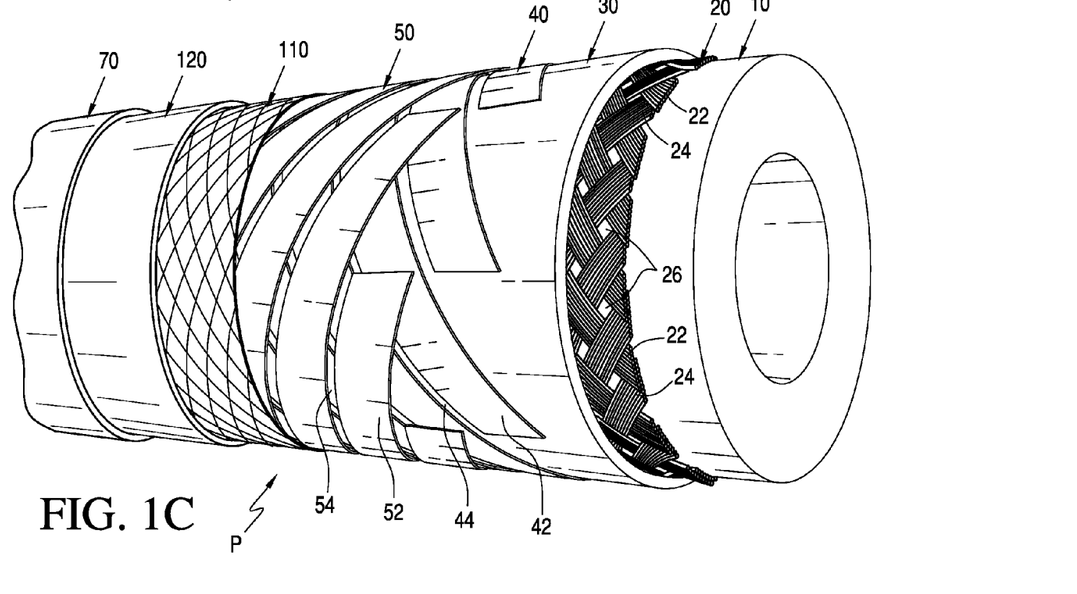
FIG. 1C is a partial isometric view showing the inventive pipe with the core, a single web layer, an extruded polymer layer, a first and a second flexible helical reinforcement layer, an insulation layer, a weight layer and a sheath layer.
Figure 1D:
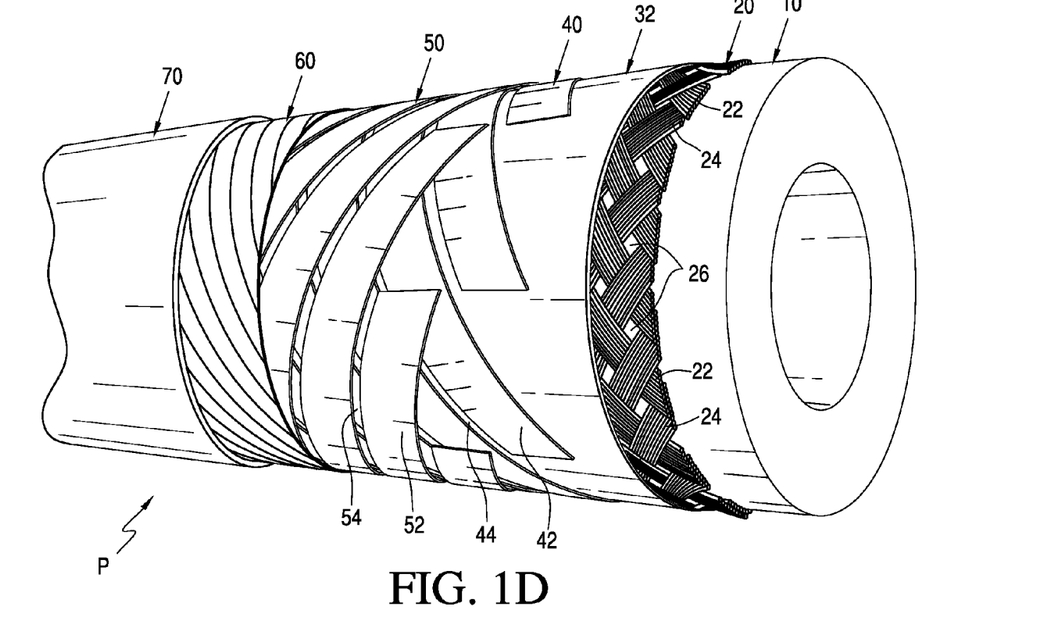
FIG. 1D is a partial isometric view showing the inventive pipe with the core, a single web layer, a thin polymer tape layer, a first and a second flexible helical reinforcement layer, a polymer tape layer and a sheath layer.

It is contemplated that a thin polymer tape layer 32 be used as shown in FIG. 1D, instead of an extruded polymer layer 30 wherein the tubular core 10, the web layer 20 and the polymer tape layer 32 are unbonded relative to one another. It is also contemplated that the web layer 20 can be outside of the outermost helical reinforcement layer 40 or 50 instead of outside of the tubular core 10 (not shown). Also, the extruded polymer layer 30 can be omitted depending upon the specific usage of the hybrid pipe P.

Figure 8A:
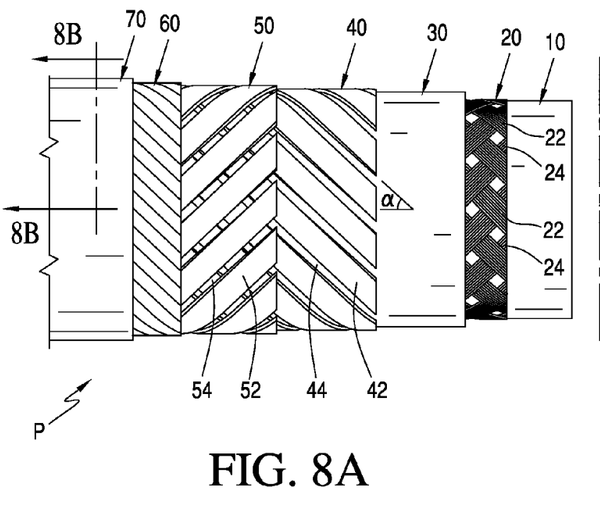
FIG. 8A is a partial side view of the inventive pipe showing the core, a wire web layer, an extruded polymer layer, a first flexible helical reinforcement layer, a second flexible helical reinforcement layer, a polymer tape layer and a sheath layer.

Refer now to FIG. 1 in which a first strip 42 is wrapped on the polymer layer 30 forming a first flexible helical reinforcement layer 40. The first strip 42 is wrapped at a lay angle a of between 20 and 80 degrees relative to the longitudinal axis of the pipe P as shown in FIG. 8A. First gap 44 is formed between subsequent wraps of the first strip 42. The number and width of the first strip 42 and width of the first gap 44 are determined according to the desired coverage of the underlying surface. Generally, the flexible helical reinforcement layer 40 will cover 40% to 95% of the underlying surface, where the underlying surface in this embodiment is the polymer layer 30.

Also shown in FIG. 1 is a second strip 52 that forms a second flexible helical reinforcement layer 50. The second strip 52 is wound in a direction opposite that of the first strip 42. The first flexible helical reinforcement layer 40 and the second flexible helical reinforcement layer 50 each provide axial and hoop strength to the pipe P. The second strip 52 is wound in a direction opposite to the direction of the first strip 42 to balance the resulting torque between the layers.

An optional polymer tape layer 60 is wound in strips on the outer surface of the outermost helical layer of the pipe P. In the embodiment illustrated in FIG. 1, the outermost helical layer is the second flexible helical reinforcement layer 50. The polymer tape layer 60 provides a barrier so that when the sheath layer 70 is extruded over the outer surface of the polymer tape layer 60, the sheath material does not extrude into the second gaps 54 between the second strips 52 or into the first gaps 44 between the first strips 42. It is contemplated that the polymer tape layer 60 can be omitted altogether.

The sheath layer 70 provides external protection to the pipe P against abrasion or other wear related damage. Sheath layer 70 also protects any metallic components of the pipe structure from environmental corrosion.

Instead of a polymer tape layer 60, an insulation layer 110 can be used as shown in FIG. 1A. The insulation layer 110 serves both to insulate the contents of the pipe and prevent extrusion of the material from the sheath layer 70 into the first gaps 44 and second gaps 54. The insulation layer 110 can be comprised of any type of desired foam or shaped insulation material.

In FIG. 1B an embodiment is shown wherein an insulation layer 110 is outside of the sheath layer 70.

The polymer layer 30 can be replaced with a polymer tape strip layer if desired or as previously indicated, the polymer layer 30 can be eliminated altogether.

Figure 5:
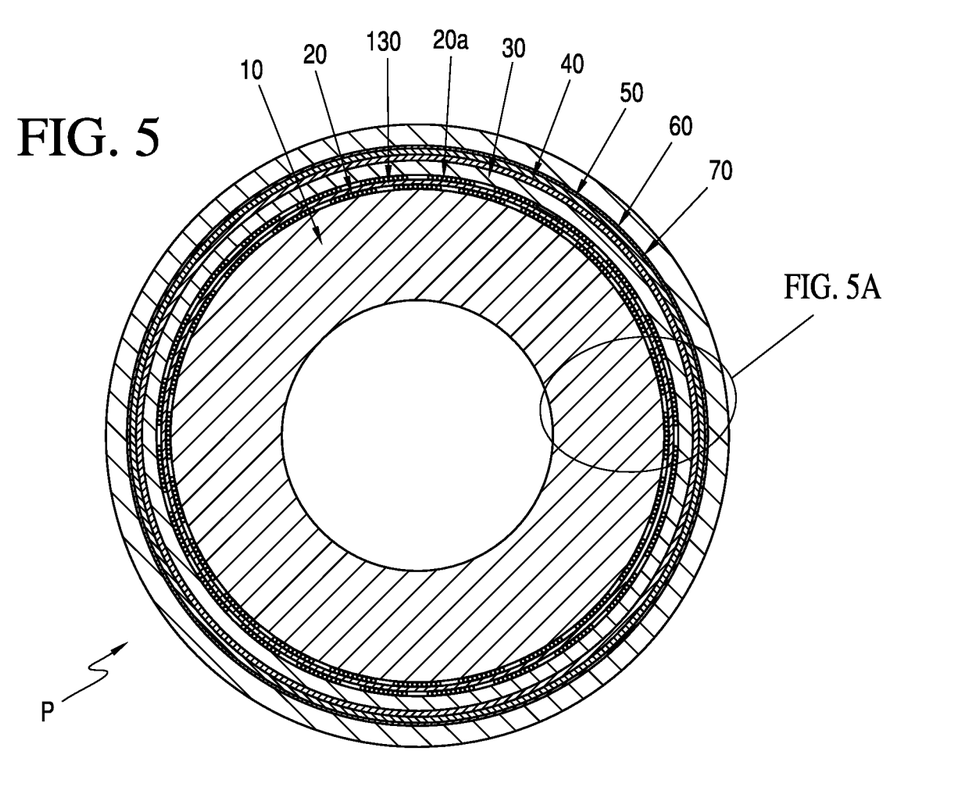
FIG. 5 is a cross sectional view of the inventive pipe showing multiple web layers and an electrical insulation layer between web layers.
Figure 5A:
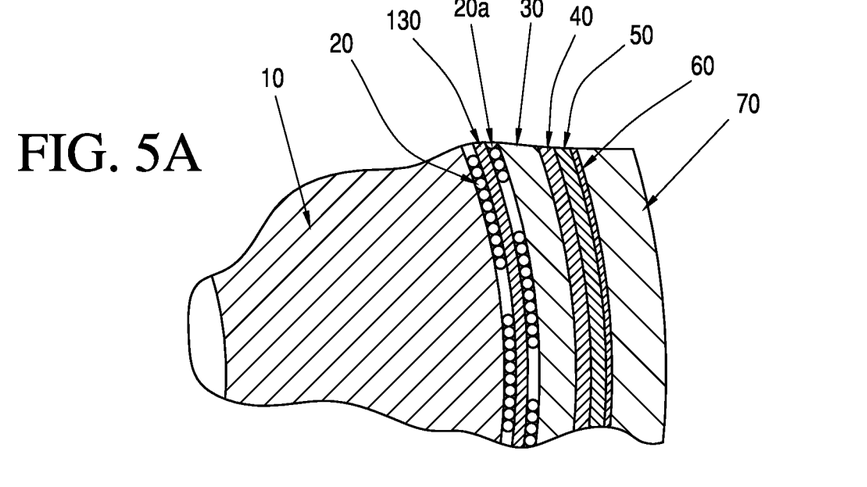
FIG. 5A is an enlarged sectional view taken from FIG. 5.

FIGS. 5 and 5A shows an electric insulation layer 130 wrapped around a first web layer 20. A second web layer 20a is wrapped around the electric insulation layer 130.

A weight layer 120, as shown in FIG. 1C may be added with a desired thickness and weight to satisfy on-bottom stability requirements. The weight layer 120 can be made of metal or other heavy materials.

Figure 8B:
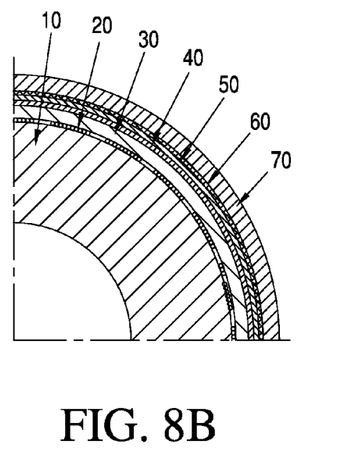
FIG. 8B is a quarter section view taken from line 8B-8B from FIG. 8A.

In FIGS. 8A and 8B an embodiment of the inventive pipe P is shown wherein the tubular core 10 is covered with a web layer 20 and a polymer layer 30. First strip 42 is wrapped on the polymer layer 30 to form a first flexible helical reinforcement layer 40. The first strip 42 may be continuous or may be applied in multiple segments. A first gap 44 is formed between consecutive wraps of the first strip 42. The gap 44 allow the pipe P to flex because as the pipe P flexes, movement is allowed between the edge surfaces of consecutive wraps of the first strip 42. If the gap 44 was not present, the edges surfaces of consecutive wraps of the first strip 42 would bind and of the resulting pipe P would be stiff and inflexible. The second strip 52 is wrapped in the opposite direction to the first strip 42 to form a second flexible helical reinforcement layer 50. The second strip 52 may also be continuous or it may be applied in multiple segments. A second gap 54 is formed between consecutive wraps of the second strip 52. The gap 54 allow the pipe P to flex because as the pipe P flexes, movement is allowed between the edge surfaces of consecutive wraps of the second strip 52. Additional flexible helical reinforcement layers 40, 50 may be added as desired to obtain the desired strength characteristics for any specific requirement.

Figure 9A:
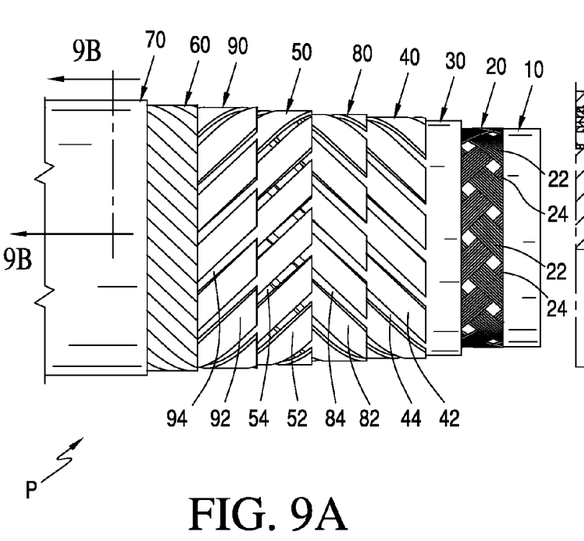
FIG. 9A is a partial side view of the inventive pipe showing the core, a wire web layer, an extruded polymer layer, a first flexible helical reinforcement layer, a first flexible helical anti-extrusion layer, a second flexible helical reinforcement layer, a second flexible helical anti-extrusion layer, a polymer tape layer and a sheath layer.
Figure 9B:
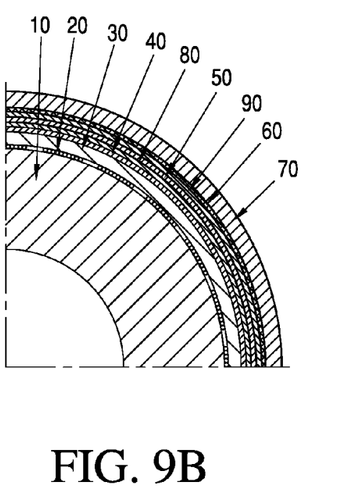
FIG. 9B is a quarter section view taken from line 9B-9B from FIG. 9A.

In FIGS. 9A and 9B an embodiment of the inventive pipe P is shown wherein the tubular core 10 is covered with a web layer 20 and a polymer layer 30. First strip 42 is wrapped on the polymer layer 30 to form a first flexible helical reinforcement layer 40. The first strip 42 may be continuous or it may be applied in multiple segments. A first anti-extrusion strip 82 is shown wrapped on top of the first strip 42. The first anti-extrusion strip 82 forms a first flexible helical anti-extrusion layer 80. The first anti-extrusion strip 82 covers the gap 44 between consecutive wraps of the first strip 42. A first anti-extrusion gap 84 is formed between consecutive wraps of the first anti-extrusion strip 82. The gaps 44 and 84 allow the pipe P to flex because as the pipe P flexes, movement is allowed between the edge surfaces of consecutive wraps of the first strip 42 and the first anti-extrusion strip 82. If the gaps 44 and 84 were not present, the edges surfaces of consecutive wraps of the first strip 42 and the first anti-extrusion strip 82 would bind and of the resulting pipe P would be stiff and inflexible.

Also shown in FIG. 9a is the second strip 52 that forms the second flexible helical reinforcement layer 50. The second strip 52 may be continuous or it may be applied in multiple segments. A second anti-extrusion strip 92 is shown wrapped on top of the second strip 52. The second anti-extrusion strip 92 forms a second flexible helical anti-extrusion layer 90. The second anti-extrusion strip 92 covers the second gap 54 between consecutive wraps of the second strip 52. A gap 94 is formed between consecutive wraps of the second anti-extrusion strip 92. The gaps 54 and 94 allow the pipe P to flex because as the pipe P flexes, movement is allowed between the edge surfaces of consecutive wraps of the second strip 52 and the second anti-extrusion strip 92. If the gaps 54 and 94 were not present, the edges surfaces of consecutive wraps of the second strip 52 and the second anti-extrusion strip 92 would bind and of the resulting pipe P would be stiff and inflexible. Additional flexible helical reinforcement layers 40, 50 and flexible helical anti-extrusion layers 80, 90 may be added as desired to obtain the desired strength characteristics for any specific requirement.

Figure 10A:
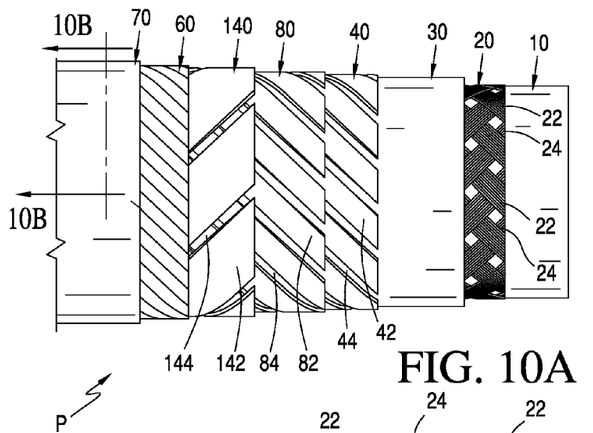
FIG. 10A is a partial side view of the inventive pipe showing the core, a wire web layer, an extruded polymer layer, a first flexible helical reinforcement layer, a first flexible helical anti-extrusion layer, a wide second flexible helical reinforcement layer, a polymer tape layer and a sheath layer.
Figure 10B:
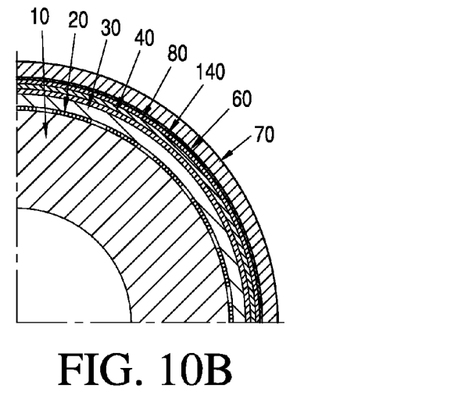
FIG. 10B is a quarter section view taken from line 10B-10B from FIG. 10A.

FIG. 10A shows an embodiment of the inventive hybrid pipe P wherein a wide strip 142 forming a wide flexible helical reinforcement layer 140 is wrapped on the surface of the first flexible helical anti-extrusion layer 80. The cross sectional area of the wide strip 142 is approximately equal to the total cross sectional area of both the first strip 42 together with the first anti-extrusion strip 82. The thickness of the wide strip 142 can be thicker than the thickness of the first strip 42 and/or the first anti-extrusion strip 82. Because the cross sectional areas of the wide strip 142 and the total cross sectional area of both the first strip 42 together with the first anti-extrusion strip 82 are approximately equal, the resulting helical wraps results in a torsionally balanced configuration around the tubular core 10 of the pipe P.

The first strip 42, second strip 52, first anti-extrusion strip 82 and second anti-extrusion strip 92 can be constructed of light weight fiber glass tape for on shore applications or can be metal tape for offshore applications. Variations in the materials to be used for the helical strips 42 and 52 of the reinforcement layers 40 and 50 or anti-extrusion strips 82 and 92 of the anti-extrusion layers 80 and 90 contemplated can include steel, alloys, aluminum and copper alloys. They can also be constructed from composites or fiber reinforced polymers. The web layers 20 and 20a can also be constructed from the full range of materials listed or other desired materials.

The sequence of the layers described can be varied if desired on the tubular core 10. More layers of the helical reinforcement layers 40, 50 and/or anti-extrusion layers 80, 90 can be added as desired.

The cross-sectional area of the first strip 42, second strip 52, first anti-extrusions strip 82 and second anti-extrusion strip 92 is typically rectangular, but it can also be other shapes. The cross section of the wire 25 is normally round but it can be any desired shape.

The typical coverage of the tubular core 10 by the helical reinforcement layers 40 and 50, and the web layer 20 is 40% to 95% but this could be varied from about 30% (if large gaps 44 and 54 exist between strips 42 and 52) to 180% (if strips 42 and 52 are overlapped with strips 82 and 92).

The sheath layer 70 can be a fully extruded layer or instead it can be a wrapped tape layer.

Although the simplest structure of the instant invention comprises a tubular core 10, a web layer 20 and a polymer layer 30 or a tubular core 10, a first helical reinforcement layer 40, a second helical reinforcement layer 50 and a sheath layer 70, a more typical structure includes a tubular core 10, at least one web layer 20, a polymer layer 30, a first flexible helical reinforcement layer 40, a second flexible helical reinforcement layer 50 and a sheath layer 70.

For a medium pressure design, the structure can be comprised of either a tubular core 10, multiple web layers 20, 20a, and a polymer extruded layer 30 or a tubular core 10, multiple web layers 20, 20a, a polymer extruded layer 30, a first flexible helical reinforcement layer 40, a second flexible helical reinforcement layer 50 and a sheath layer 70.

For a high pressure design, the structure can include any combination of the layers in varying order (tubular core 10, at least one web layer 20, a polymer extruded layer 30, a first flexible helical reinforcement layer 40, a second flexible helical reinforcement layer 50, sheath layer 70).

In medium or high pressure designs, the polymer extruded layer 30 can be omitted or replaced with the thin polymer tape layer 32.

Other variations in the design and sequence of application of the layers, geometry of the layers and materials used are contemplated and such variations fall within the spirit and scope of the invention as claimed.

What is claimed is:

1. A hybrid flexible pipe, comprising:
  a. a tubular core having a longitudinal passage for internal fluid;
  b. at least one web layer comprised of a plurality of webbed wires positioned on top of said tubular core;
  c. a polymer layer over said at least one web layer;
  d. at least one first flexible helical reinforcement layer comprised of a first strip being helically wrapped on top of said polymer layer;
  e. said at least one first strip is wrapped to form a first gap between consecutive wraps of said first strip;
  f. at least one second flexible helical reinforcement layer comprised of a second strip is helically wrapped around said at least one first helical reinforcement layer in a direction substantially opposite to that of said first strip;
  g. said at least one second strip is wrapped to form a second gap between consecutive wraps of said second strip; and
  h. a sheath layer positioned as the outermost layer.

2. A hybrid flexible pipe according to claim 1 wherein:
  a. a first flexible helical anti-extrusion layer comprised of a first anti-extrusion strip is helically wrapped around said at least one first flexible helical reinforcement layer; said first anti-extrusion strip is wrapped in substantially the same direction as said first strip; said first anti-extrusion strip substantially covers said first gap between the consecutive wraps of said first strip; and
  b. a second flexible helical anti-extrusion layer comprised of a second anti-extrusion strip is helically wrapped around said at least one second helical reinforcement layer; said second anti-extrusion strip is wrapped in substantially the same direction as said at least one second strip; said second anti-extrusion strip substantially covers said second gap between the consecutive wraps of said second strip.

3. A hybrid flexible pipe according to claim 2 wherein a polymer layer is helically wrapped without gaps between wraps on an outer side of said second flexible helical anti-extrusion layer.

4. A hybrid flexible pipe according to claim 1 wherein said polymer layer is fused with said tubular core and with said at least one web layer.

5. A hybrid flexible pipe according to claim 1 wherein said polymer layer is attached with adhesive to said tubular core and to said at least one web layer.

6. A hybrid flexible pipe according to claim 1 wherein a polymer tape layer is helically wrapped without gaps between wraps on an outer side of said second flexible helical reinforcement layer.

7. A hybrid flexible pipe according to claim 1 wherein a plurality of web layers are positioned on said tubular core.

8. A method of manufacturing a hybrid flexible pipe, comprising the steps of:
  a. adding at least one web layer around a tubular core having a longitudinal passage for internal fluid;
  b. positioning a polymer layer over said at least one web layer;

c. wrapping at least one first flexible helical reinforcement layer comprising a first strip on top of said polymer layer;
d. forming a first gap between consecutive wraps of said first strip;
e. wrapping at least one second flexible helical reinforcement layer comprising a second strip around said at least one first helical reinforcement layer in a direction substantially opposite to that of said first strip;
f. forming a second gap between consecutive wraps of said second strip; and
g. positioning a sheath layer as the outermost layer.

9. A method of manufacturing a hybrid flexible pipe according to claim 8, comprising the additional steps of:
h. wrapping a first flexible helical anti-extrusion layer comprised of a first anti-extrusion strip around said at least one first flexible helical reinforcement layer in substantially the same direction as said at least one first strip;
i. substantially covering said first gap between the consecutive wraps of said first strip with said first anti-extrusion strip;
j. wrapping a second flexible helical anti-extrusion layer comprised of a second anti-extrusion strip around said at least one second flexible helical reinforcement layer in substantially the same direction as said at least one second strip; and
k. substantially covering said second gap between the consecutive wraps of said second strip with said second anti-extrusion strip.

10. A method of manufacturing a hybrid flexible pipe according to claim 8, comprising the additional step of:
wrapping a polymer tape layer without gaps around an outermost helical reinforcement layer.

11. A method of manufacturing a hybrid flexible pipe according to claim 8 comprising the additional step of positioning a plurality of web layers on said tubular core.

* * * * *